(12) United States Patent
Hu (10) Patent No.: US 11,587,583 B1
(45) Date of Patent: Feb. 21, 2023

(54) SLIDER AIR BEARING DESIGN WITH ROUGHENED LEADING EDGE SHALLOW STEP FOR ENHANCED PARTICLE ROBUSTNESS

(71) Applicant: Western Digital Technologies, Inc., San Jose, CA (US)

(72) Inventor: Yong Hu, San Ramon, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/652,872

(22) Filed: Feb. 28, 2022

(51) Int. Cl.
  *G11B 5/60* (2006.01)
  *G11B 5/48* (2006.01)

(52) U.S. Cl.
  CPC .......... *G11B 5/4826* (2013.01); *G11B 5/6005* (2013.01); *G11B 5/6064* (2013.01); *G11B 5/6082* (2013.01)

(58) Field of Classification Search
  CPC ... G11B 5/1871; G11B 5/6082; G11B 5/6005; G11B 5/60; G11B 5/6064
  See application file for complete search history.

(56) References Cited

U.S. PATENT DOCUMENTS

| | | | | |
|---|---|---|---|---|
| 5,079,657 A * | 1/1992 | Aronoff | ............... | G11B 5/6005 |
| 6,040,965 A * | 3/2000 | Terunuma | ............... | B82Y 25/00 |
| 6,104,571 A * | 8/2000 | Kabasawa | ............... | G11B 21/21 |
| | | | | 360/236.4 |
| 6,125,004 A * | 9/2000 | Katase | ................ | G11B 5/3106 |
| 6,212,042 B1 * | 4/2001 | Gui | ...................... | G11B 5/6005 |
| | | | | 360/236.8 |
| 6,297,932 B1 * | 10/2001 | Liu | ...................... | G11B 5/6005 |
| | | | | 360/235.8 |
| 6,381,098 B1 * | 4/2002 | Boutaghou | .......... | G11B 5/6005 |
| 6,396,663 B1 * | 5/2002 | Kasamatsu | .......... | G11B 5/6005 |
| | | | | 360/235.8 |
| 6,459,547 B1 * | 10/2002 | Riddering | ............ | G11B 5/6005 |
| | | | | 360/235.8 |

(Continued)

FOREIGN PATENT DOCUMENTS

CN 107799129 B 12/2019
JP 2002133630 A 5/2002

OTHER PUBLICATIONS

Dae-Eun Kim et al., "Tribological design methods for minimum surface damage of HDD slider," Tribology International, 36(4):467-473, Apr. 2003.

(Continued)

*Primary Examiner* — Brian E Miller (57) ABSTRACT

Described herein are sliders and data storage devices that promote particle mobility to improve particle robustness. In some embodiments, a data storage device includes a recording medium and a slider. A surface of the slider air-bearing surface near the leading edge includes at least one roughening feature that causes the surface to be rougher than other surfaces of the slider to promote particle mobility. The roughening feature may include a regular or irregular pattern, and it may be created using a photoresist mask during the manufacturing process so that the surface is deliberately made rougher (e.g., has a higher friction coefficient) than the surface of a leading pad of the slider.

28 Claims, 6 Drawing Sheets

(56) References Cited

U.S. PATENT DOCUMENTS

| | | | | |
|---|---|---|---|---|
| 6,462,909 B1* | 10/2002 | Boutaghou | G11B 5/6005 | 360/236.1 |
| 6,504,682 B1* | 1/2003 | Sannino | G11B 5/6005 | 360/236.1 |
| 6,510,027 B1* | 1/2003 | Chapin | G11B 21/21 | 360/235.8 |
| 6,515,831 B1* | 2/2003 | Sannino | G11B 5/6005 | 360/236.1 |
| 6,611,400 B1* | 8/2003 | Polycarpou | G11B 21/21 | |
| 6,870,707 B1* | 3/2005 | Zheng | G11B 5/6005 | |
| 6,937,439 B1* | 8/2005 | Chang | G11B 5/6082 | 360/235.8 |
| 7,106,556 B2* | 9/2006 | Pendray | G11B 5/6005 | |
| 7,265,943 B2* | 9/2007 | Boutaghou | G11B 5/6005 | 360/235.8 |
| 7,643,251 B1* | 1/2010 | Zhang | G11B 5/6005 | 360/235.6 |
| 8,300,360 B2* | 10/2012 | Bandic | G11B 5/6005 | 360/235.4 |
| 8,611,051 B1* | 12/2013 | Hanyu | G11B 5/6082 | 360/236.3 |
| 9,082,441 B1* | 7/2015 | Hu | G11B 5/6082 | |
| 9,190,089 B1 | 11/2015 | Zhang | | |
| 9,230,587 B1 | 1/2016 | Hu et al. | | |
| 9,691,422 B1* | 6/2017 | Hu | G11B 5/6005 | |
| 9,886,976 B2* | 2/2018 | Huang | B29C 64/188 | |
| 10,249,334 B1 | 4/2019 | Hu et al. | | |
| 10,354,685 B1* | 7/2019 | Hu | G11B 5/1871 | |
| 10,984,828 B1* | 4/2021 | Huang | G11B 5/4826 | |
| 2002/0008939 A1* | 1/2002 | Boutaghou | G11B 5/6005 | 360/236.1 |
| 2002/0012199 A1* | 1/2002 | Polycarpou | G11B 21/21 | 360/235.8 |
| 2002/0012200 A1* | 1/2002 | Boutaghou | G11B 21/21 | |
| 2002/0030937 A1* | 3/2002 | Liu | G11B 5/6005 | 360/235.8 |
| 2002/0051316 A1* | 5/2002 | Boutaghou | G11B 5/6005 | 360/236.5 |
| 2002/0060982 A1* | 5/2002 | Hipwell | G11B 5/6082 | 977/932 |
| 2002/0075600 A1* | 6/2002 | Schnur | G11B 5/6082 | 360/235.8 |
| 2002/0089790 A1* | 7/2002 | Stoebe | G11B 5/6082 | 360/235.8 |
| 2002/0122275 A1* | 9/2002 | Stover | G11B 5/6005 | 360/234.3 |
| 2002/0145828 A1* | 10/2002 | Mundt | G11B 11/1058 | |
| 2002/0191340 A1* | 12/2002 | Chapin | G11B 5/6005 | 360/235.8 |
| 2003/0137773 A1* | 7/2003 | Polycarpou | G11B 5/6005 | 360/235.8 |
| 2004/0264053 A1* | 12/2004 | Pendray | G11B 5/54 | |
| 2006/0139810 A1* | 6/2006 | Hashimoto | G11B 5/40 | 360/235.8 |
| 2006/0221502 A1* | 10/2006 | Watanabe | G11B 5/6005 | 360/235.8 |
| 2009/0284869 A1* | 11/2009 | Bandic | G11B 5/6005 | 360/235.4 |
| 2010/0091406 A1* | 4/2010 | Huang | G11B 5/6005 | 360/235.4 |
| 2010/0149692 A1* | 6/2010 | Fujimaki | G11B 5/6005 | 360/235.8 |
| 2010/0226035 A1 | 9/2010 | Huang et al. | | |
| 2011/0096441 A1 | 4/2011 | Kunkel et al. | | |
| 2012/0050918 A1 | 3/2012 | Ambekar et al. | | |
| 2012/0154953 A1* | 6/2012 | Dorius | G11B 5/6076 | |
| 2014/0022672 A1 | 1/2014 | Ramakrishnan et al. | | |
| 2018/0068687 A1* | 3/2018 | Yamane | G11B 5/6082 | |
| 2020/0312357 A1* | 10/2020 | Hu | G11B 5/6082 | |
| 2021/0035603 A1 | 2/2021 | Pan et al. | | |

OTHER PUBLICATIONS

Somchai Laksanasittiphan et al., "Experimental Study of Particles Induced by Screw Tightening Process for Hard Disc Drive Assembly: Effects of 'Bit' Speed," Engineering Journal, vol. 22 Issue 1, Jan. 31, 2018.

International Search Report and Written Opinion from PCT Application No. PCT/US2022/030434 (filed May 22, 2022), dated Nov. 22, 2022.

* cited by examiner

SLIDER AIR BEARING DESIGN WITH ROUGHENED LEADING EDGE SHALLOW STEP FOR ENHANCED PARTICLE ROBUSTNESS

BACKGROUND

Data storage systems are used to store large amounts of information. A data storage system typically includes a read/write transducer for retrieving and storing information. Some data storage systems use rotating storage devices, such as rotating optical devices (e.g., CD and DVD drives) or hard disk drives containing rotating magnetic disks (also referred to as platters or media). In some such data storage systems, a suspended slider supports a head that includes the read/write transducer. The slider provides mechanical support for the head and the electrical connections between the head and the rest of the data storage system.

When the data storage system is in operation, the slider floats a small distance above the recording medium (e.g., a hard disk in a hard disk drive), which rotates at high speeds. Components of the data storage system move the slider and, therefore, the head to a desired radial position over the surface of the rotating medium, and the head reads or writes information. The slider rides on a cushion or bearing of air or gas created above the surface of the medium as the disk rotates at its operating speed. The slider has an air-bearing surface (ABS) that faces the medium. The ABS is designed to generate an air-bearing force that counteracts a preload bias that pushes the slider toward the medium. The ABS causes the slider to fly above and out of contact with the medium.

Many data storage devices, such as hard disk drives, are operated in a standard air (e.g., nitrogen, oxygen, and water vapor mixture) atmosphere. Spinning disks in hard disk drives at high revolutions per minute against the friction of an air atmosphere is largely inefficient and requires a certain amount of power. As an alternative, data storage devices, such as hard disk drives, can be filled with a lower-density gas, such as helium, and sealed to control and maintain the device's internal environment, and to prevent the helium from escaping from the interior of the data storage device. Sealing mitigates or prevents leakage of internal gases from within the storage device. The use of helium, which has a density that is approximately one-seventh that of air, reduces friction and vibration in the device, thereby creating less drag and turbulence. Consequently, by running the hard disk drive in a less-dense atmosphere, such as an atmosphere of helium or a helium mixture, friction on the disk is reduced, thereby causing the disk to require less power in order to spin at a similar rate as the disks in drives that operate in standard air conditions. The use of helium also reduces the operating temperature of the drive, as well as noise generated by the drive.

The lower ambient pressure in sealed helium drives poses challenges to data storage devices, however. For example, when operating in helium or a helium mixture, rather than air, the surface of the recording medium can be more susceptible to particle scratches due to reduced particle mobility (because of less pressure gradient and less shear). Particles, lube pick-up, contaminants, and/or smear can build up on the ABS and damage the recording media or cause data stored on the media to be erased. Thus, there is an ongoing need for sliders designs that provide improved particle robustness.

SUMMARY

This summary represents non-limiting embodiments of the disclosure.

In some aspects, the techniques described herein relate to a slider, including: a leading-edge surface; and a media-facing surface including a plurality of surfaces, including: a first surface, wherein the first surface is substantially perpendicular to the leading-edge surface and, of the plurality of surfaces of the media-facing surface, is configured to be situated closest to a recording medium, and a second surface adjacent to the leading-edge surface and substantially perpendicular to the leading-edge surface, wherein the second surface is recessed from the first surface, wherein the second surface includes at least one roughening feature that results in at least a portion of the second surface having a higher friction coefficient than the first surface. In some embodiments, the techniques described herein relate to a data storage device comprising the slider and the recording medium. In some aspects, the techniques described herein relate to a data storage device, further including: helium between the recording medium and the slider, wherein the data storage device is sealed to prevent the helium from escaping from an interior of the data storage device.

In some aspects, the techniques described herein relate to a slider, wherein the at least one roughening feature includes at least 6 holes per 1000 $\mu m^2$ in the second surface.

In some aspects, the techniques described herein relate to a slider, wherein each of the at least 6 holes per 1000 $\mu m^2$ has a depth of at least 2 nm.

In some aspects, the techniques described herein relate to a slider, wherein a recess distance between the first surface and the second surface is between approximately 50 nm and approximately 300 nm.

In some aspects, the techniques described herein relate to a slider, wherein the at least one roughening feature includes a pattern.

In some aspects, the techniques described herein relate to a slider, wherein the pattern includes a plurality of dimples.

In some aspects, the techniques described herein relate to a slider, wherein the pattern includes at least 6 holes per 1000 $\mu m^2$.

In some aspects, the techniques described herein relate to a slider, wherein at least two of the at least 6 holes per 1000 $\mu m^2$ have a substantially identical shape.

In some aspects, the techniques described herein relate to a slider, wherein a depth of at least a portion of the pattern is at least 2 nm relative to the second surface.

In some aspects, the techniques described herein relate to a slider, wherein the pattern includes a cross-hatch.

In some aspects, the techniques described herein relate to a slider, wherein the pattern includes a plurality of grooves.

In some aspects, the techniques described herein relate to a slider, wherein the pattern is irregular.

In some aspects, the techniques described herein relate to a slider, wherein a first portion of the pattern has a first depth, and a second portion of the pattern has a second depth, wherein the first depth differs from the second depth.

In some aspects, the techniques described herein relate to a slider including: a leading-edge surface, a non-patterned surface substantially perpendicular to and spaced from the leading-edge surface, and a patterned surface directly adjacent to and substantially perpendicular to the leading-edge surface, wherein the patterned surface includes a pattern. In some aspects, the techniques described herein relate to a data storage device including the slider and a recording media situated facing the patterned surface and the non-patterned surface. In some aspects, the techniques described herein relate to a data storage device, further including: helium between the recording media and the slider, wherein the data storage device is sealed to prevent the helium from escaping from an interior of the data storage device.

In some aspects, the techniques described herein relate to a slider, wherein the pattern includes at least 6 holes per 1000 µm².

In some aspects, the techniques described herein relate to a slider, wherein at least two of the at least 6 holes per 1000 µm² have a substantially identical shape.

In some aspects, the techniques described herein relate to a slider, wherein a depth of at least one of the at least 6 holes per 1000 µm² is at least 2 nm.

In some aspects, the techniques described herein relate to a slider, wherein the pattern includes a plurality of grooves.

In some aspects, the techniques described herein relate to a slider, wherein the pattern is a cross-hatch pattern.

In some aspects, the techniques described herein relate to a slider, further including: a particle-trapping structure adjacent to the patterned surface, wherein, in an orientation in which the non-patterned surface and the patterned surface are oriented upward, the particle-trapping structure includes at least one cavity extending below the patterned surface.

In some aspects, the techniques described herein relate to a slider, wherein a maximum depth of the pattern is between approximately 2 nm and approximately 2 µm, and wherein a depth of the at least one cavity is at least 200 nm relative to the non-patterned surface.

In some aspects, the techniques described herein relate to a slider, wherein the slider includes a plurality of surfaces, including a first surface and a second surface, wherein, in an orientation in which an air-bearing surface of the slider is oriented upward, the second surface is below the first surface, and wherein the non-patterned surface is included in the first surface, and the patterned surface is included in the second surface.

In some aspects, the techniques described herein relate to a slider, wherein a height difference between the first surface and the second surface is between approximately 50 nm and approximately 300 nm.

In some aspects, the techniques described herein relate to a method of making a slider that comprises a patterned surface, including: applying a mask to a wafer, wherein the mask defines the pattern; and while the mask is in place, performing an ion milling step to create the pattern.

BRIEF DESCRIPTION OF THE DRAWINGS

Objects, features, and advantages of the disclosure will be readily apparent from the following description of certain embodiments taken in conjunction with the accompanying drawings in which.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

Disclosed herein are sliders that mitigate the deleterious effects of particles in data storage devices. The disclosed techniques may be used, for example, to improve the particle performance of data storage systems in lower-pressure atmospheres. Also disclosed are methods of making sliders providing improved particle robustness, and data storage devices comprising such sliders. The disclosures herein can be used to improve the particle robustness of the slider and the data storage device by promoting particle mobility over the ABS of the slider. It is to be understood that the legacy terms "air-bearing surface" and "ABS" are used herein to refer to the media-facing surface of the slider regardless of whether the data storage device operates in air or in a lower-pressure atmosphere (e.g., in helium or another lighter-than-air gas).

Figure 1:
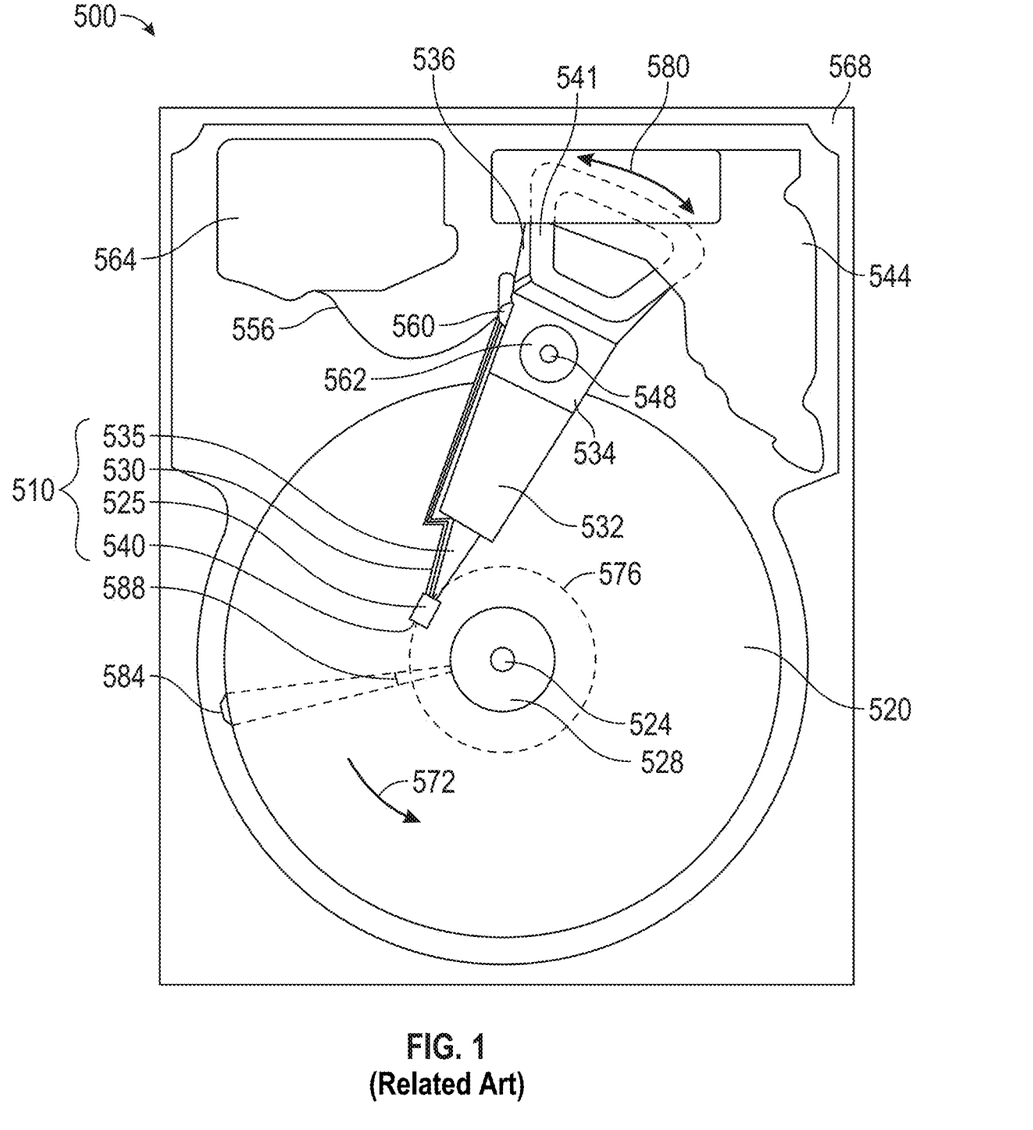
FIG. 1 is a plan view illustrating an example of a data storage device that may include one or more of the embodiments disclosed herein.

FIG. 1 is a plan view illustrating an example of a data storage device 500, illustrated as a hard disk drive, that may include one or more of the embodiments disclosed herein. FIG. 1 illustrates an example of the functional arrangement of components of the data storage device 500, including a slider 525 that includes a recording head 540. The recording head 540 (which may also be referred to herein as a transducer or a read/write transducer) includes a write element and a read element for respectively writing and reading information stored on a recording medium 520 of the data storage device 500. The data storage device 500 includes at least one head gimbal assembly (HGA) 510, which includes the slider 525, a suspension and actuator arm 530 attached to the slider 525, and a load beam 535 attached to the suspension and actuator arm 530. The data storage device 500 also includes at least one recording medium 520, which may be, for example, a magnetic recording medium, rotatably mounted on a spindle 524, and a drive motor (not shown) attached to the spindle 524 for rotating the recording medium 520. The recording medium 520, which may include a plurality of disks, may be affixed to the spindle 524 with a disk clamp 528.

The data storage device 500 further includes an arm 532 attached to the HGA 510, a carriage 534, a voice-coil motor (VCM) that includes an armature 536 including a voice coil 541 attached to the carriage 534, and a stator 544 including a voice-coil magnet. The armature 536 of the VCM is attached to the carriage 534 and is configured to move the arm 532 and the HGA 510 to access portions of the recording medium 520. The carriage 534 is mounted on a pivot-shaft 548 with an interposed pivot-bearing assembly 562. In the case of an HDD having multiple disks (also sometimes referred to as "platters"), the carriage 534 may be called an "E-block," or comb, because the carriage 534 is arranged to carry a ganged array of arms (multiple instances of the arm 532) that gives it the appearance of a comb.

An assembly comprising a head gimbal assembly (e.g., HGA 510), including a suspension flexure to which the slider 525 is coupled, an actuator arm (e.g., the arm 532) to which the suspension is coupled, and an actuator (e.g., the VCM) to which the actuator arm is coupled, may be collectively referred to as a head stack assembly (HSA). The HSA also includes a suspension tail. Generally, the HSA is the assembly configured to move the slider 525 to enable the recording head 540 to access portions of the recording medium 520 (e.g., magnetic-recording disks) for read and write operations.

In accordance with some embodiments, electrical signals (for example, current to the voice coil 541 of the VCM, write signals to and read signals from the recording head 540, etc.) are provided by a flexible interconnect cable 556 (which may be referred to as a "flex cable"). Interconnection between the flex cable 556 and the recording head 540 may be provided by an arm-electronics (AE) module 560, which may have an on-board pre-amplifier for the read signal, as well as other read-channel and write-channel electronic components. The AE module 560 may be attached to the carriage 534 as shown. The flex cable 556 is coupled to an electrical-connector block 564, which provides electrical communication through electrical feed-throughs provided by a data storage device housing 568. The data storage device housing 568, in conjunction with a cover (not shown), provides a sealed, protective enclosure for the information storage components of the data storage device 500.

In accordance with some embodiments, other electronic components, including a disk controller and servo electronics such as a digital-signal processor (DSP), provide electrical signals to the drive motor, the voice coil 541 of the VCM, and the recording head 540 of the HGA 510. The electrical signal provided to the drive motor enables the drive motor to spin, thereby providing a torque to the spindle 524, which is in turn transmitted to the recording medium 520 that is affixed to the spindle 524 by the disk clamp 528; as a result, the recording medium 520 spins in a direction 572. Because it is spinning, the recording medium 520 creates a cushion of air that acts as an air-bearing on which the air-bearing surface (ABS) of the slider 525 rides so that the slider 525 flies above the surface of the recording medium 520 without making contact with a thin magnetic-recording layer of the recording medium 520 in which information is recorded.

The electrical signal provided to the voice coil 541 of the VCM enables the recording head 540 of the HGA 510 to access a track 576 on which information is recorded. Thus, the armature 536 of the VCM swings through an arc 580, which enables the HGA 510 attached to the armature 536 by the arm 532 to access various tracks on the recording medium 520. Information is stored on the recording medium 520 in a plurality of sectored tracks arranged in sectors on the recording medium 520, for example, sector 584. Correspondingly, each track is composed of a plurality of sectored track portions, for example, the sectored track portion 588. Each sectored track portion 588 includes recorded data and a header containing a servo-burst-signal pattern, for example, an ABCD-servo-burst-signal pattern, information that identifies the track 576, and error correction code information. In accessing the track 576, the read element of the recording head 540 of the HGA 510 reads the servo-burst-signal pattern, which provides a position-error-signal (PES) to the servo electronics, which controls the electrical signal provided to the voice coil 541 of the VCM, enabling the recording head 540 to follow the track 576. Upon finding the track 576 and identifying a particular sectored track portion 588, the recording head 540 either reads data from the track 576 or writes data to the track 576, depending on instructions received by the disk controller from an external agent, for example, a microprocessor of a computer system to which the data storage device 500 is connected.

For reading the information stored on the recording medium 520, the recording head 540 may include only one read sensor, or it may include multiple read sensors. The read sensor(s) in the recording head 540 may include, for example, one or more giant magnetoresistance (GMR) sensors, tunneling magnetoresistance (TMR) sensors, or another type of magnetoresistive sensor. When the slider 525 passes over a track 576 on the recording medium 520, the recording head 540 detects changes in resistance due to magnetic field variations recorded on the recording medium 520, which represent the recorded bits.

The data storage device 500 may be what is at times referred to as a "hybrid drive." A hybrid drive refers generally to a storage device having functionality of both a traditional hard disk drive (HDD) combined with a solid-state storage device (SSD) using non-volatile memory, such as flash or other solid-state (e.g., integrated circuits) memory, which is electrically erasable and programmable. Because operation, management, and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Furthermore, a hybrid drive may be architected and configured essentially as two storage devices in a single enclosure, e.g., a traditional HDD and a SSD, with either one or multiple interfaces for host connection.

Figure 2:
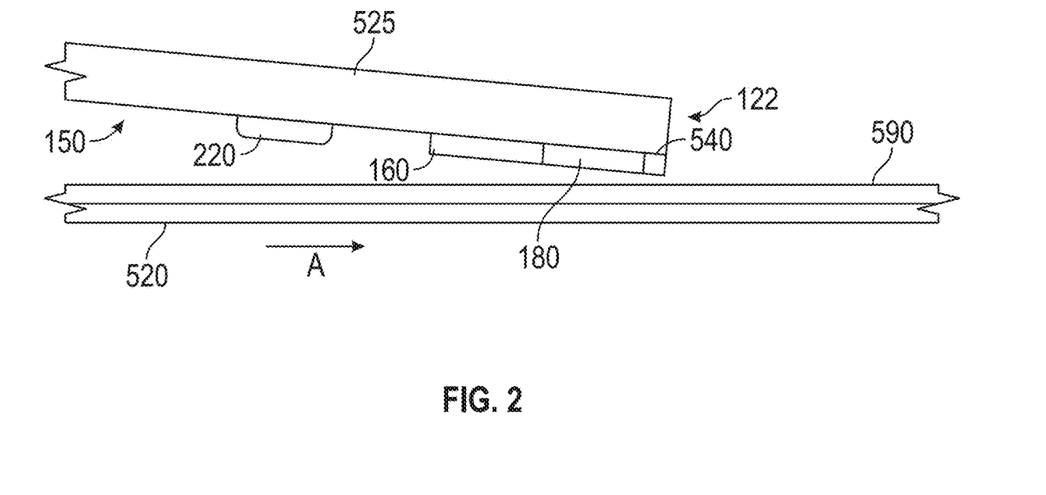
FIG. 2 is a side view of the slider and the recording medium shown FIG. 1.

FIG. 2 is a side view of the slider 525 and the recording medium 520 of the data storage device 500 shown in FIG. 1 in accordance with some embodiments. The slider 525 may include one or more of the embodiments disclosed herein. The recording medium 520 is moving in the direction of the arrow A and causes airflow in the same direction. This airflow flows over the ABS 150 of the slider 525 and produces the lifting pressure described above. In some embodiments, the slider 525 includes raised areas such as a leading pad 220, one or more side pads 160, and a trailing pad 180. The trailing pad 180, located adjacent to the trailing-edge surface 122 of the slider 525, may further include the recording head 540 that writes data to and reads data from the recording medium 520. The recording medium 520 has a lubricant 590 on its upper surface to protect the recording layer of the recording medium 520 from contact with the slider 525 and/or other components of the data storage device 500.

Particle build-up can be a significant problem for both data storage devices (e.g., hard disk drives) that operate in air and data storage devices that operate in lower-pressure-environments, such as sealed helium drives. The problem can be particularly acute in lower pressure environments. Particles tend to build up at the leading edge surface of the slider 525, particularly in areas close to the leading pad 220. These particles may touch the recording medium 520, which can result in damage to the recording medium 520. Some types of particles (e.g., harder particles such as diamond, alumina, TiC, etc.) are likely to scratch the recording medium 520 if they touch it. Other types of particles (e.g., softer particles such as silicon, stainless steel, lubricant 590, etc.) are less likely to cause detectable physical damage to the recording medium 520, but they can still cause recorded magnetic information to be erased because of thermal and/or mechanical stress.

To obtain good performance, particularly in a data storage device 500 filled with gas having lower-density than air (e.g., helium), it is desirable for the slider 525 to fly close to the surface of the recording medium 520. But as the distance between the slider 525 and the recording medium 520 decreases, the likelihood of particles damaging the recording medium 520 increases. For example, in sealed helium hard disk drives, there is significantly less pressure gradient at the trailing edge of the slider 525, which causes little-to-no backflow at the trailing edge. The lower pressure gradient causes particles to be less mobile, which can lead to particle build-up. Consequently, it is desirable to mitigate the deleterious effects of particles in data storage devices 500. The disclosures herein can be used to improve the particle robustness of the slider 525 and the data storage device 500 by promoting particle mobility over the ABS 150 of the slider 525.

Figure 3A:
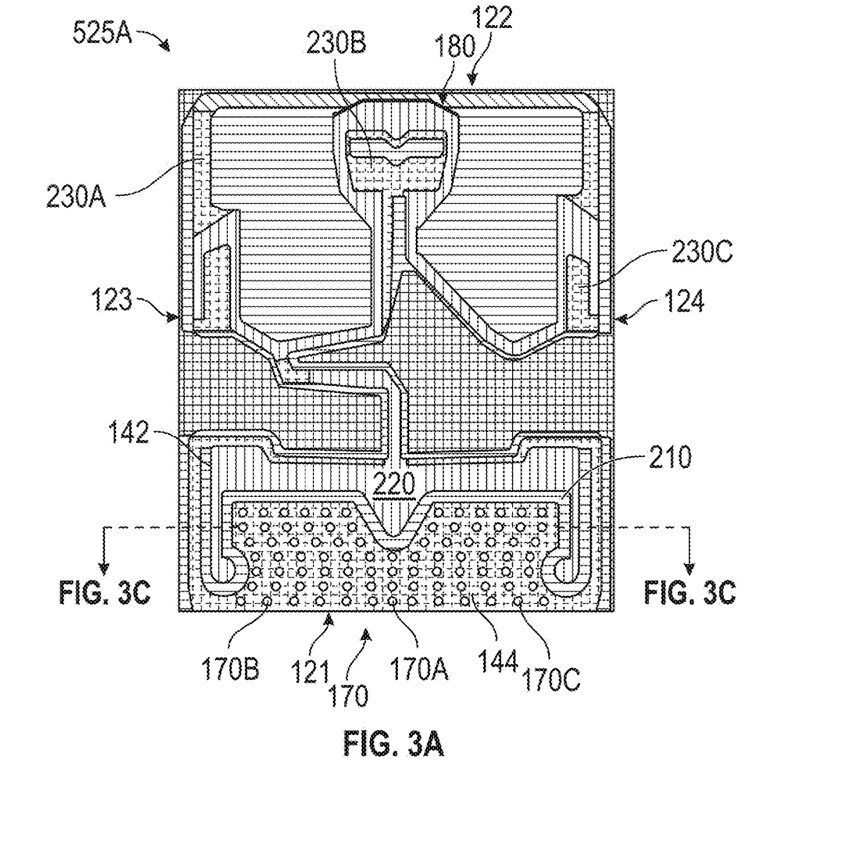
FIG. 3A is an ABS view of an example slider in accordance with some embodiments.
Figure 3B:
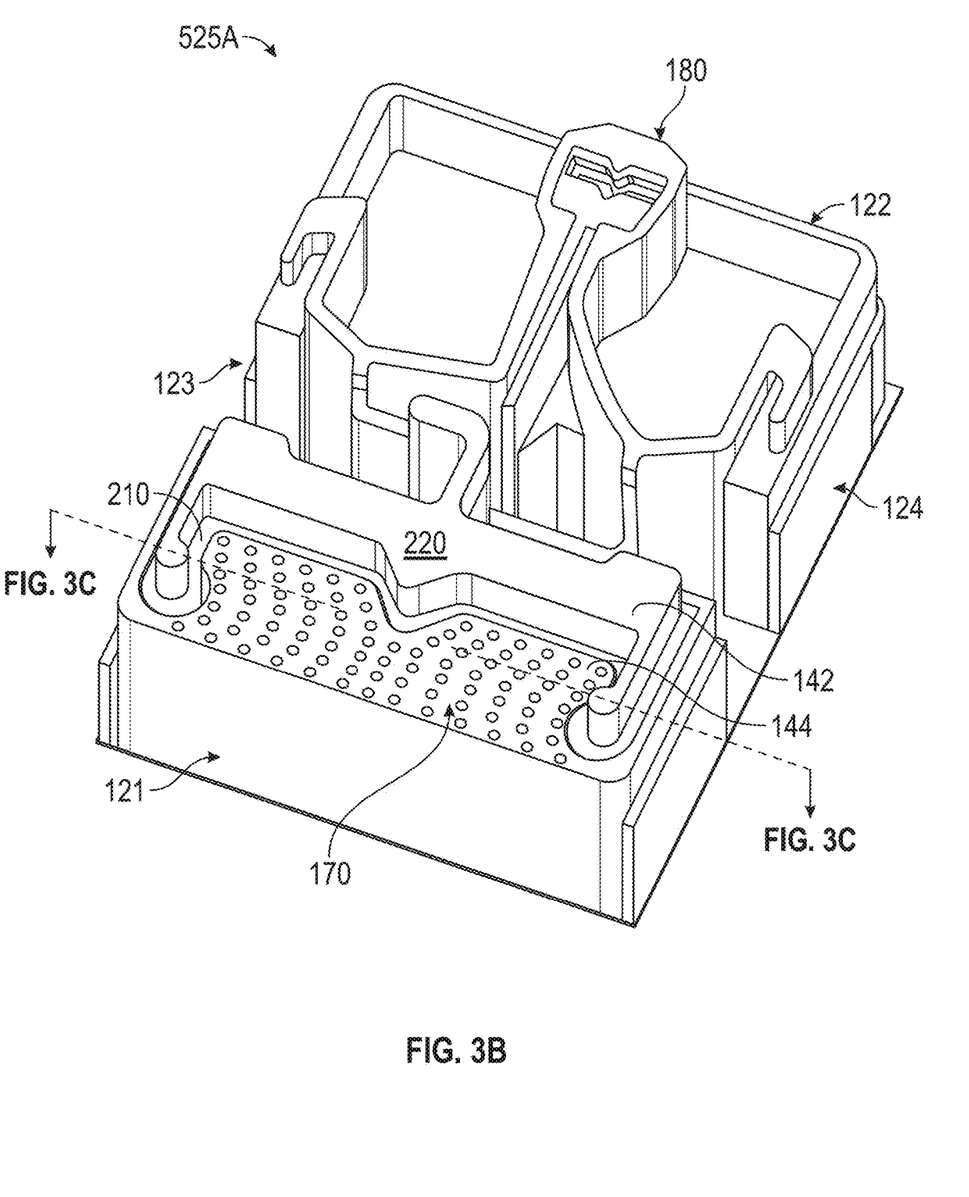
FIG. 3B is an isometric view of the example slider shown in FIG. 3A.
Figure 3C:
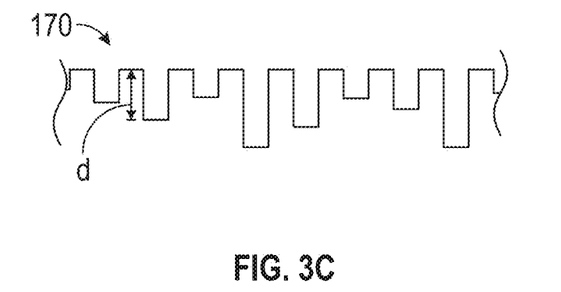
FIG. 3C is a cross-section view of a portion of the example slider shown in FIGS. 3A and 3B.

FIG. 3A is an ABS view of an example of a slider 525A in accordance with some embodiments. FIG. 3B is an isometric view of the slider 525A shown in FIG. 3A. FIG. 3C is a cross-section view of a portion of the slider 525A at the location indicated in FIGS. 3A and 3B. The slider 525A has a leading-edge surface 121, a trailing-edge surface 122 opposite the leading-edge surface 121, a first side-edge surface 123 extending between the leading-edge surface 121 and the trailing-edge surface 122, and a second side-edge surface 124 opposite the first side-edge surface 123 and extending between the leading-edge surface 121 and the trailing-edge surface 122. The slider 525A includes a leading pad 220 near the leading-edge surface 121 and a trailing pad 180 near the trailing-edge surface 122 of the slider 525A. Typically, the trailing pad 180 has a recording head 540 mounted thereon, on the rear portion of the trailing pad 180 close to the trailing-edge surface 122 of the slider 525A.

The ABS 150 of the slider 525A includes several surfaces. With the slider 525A oriented as shown in FIG. 3B (with the ABS 150 facing upward), the top of the leading pad 220 is the surface 142. The surface 142 is at a level that, when the ABS 150 is facing upward, is the highest level of the ABS 150. When the slider 525A is installed in a data storage device 500, the surface 142 is at the level of the ABS 150 that is closest to the recording medium 520. (It is to be understood that when the recording medium 520 spins, the surface 142 may fly further from the recording medium 520 than other surfaces of the slider 525 at the same level as the surface 142 due to the pitch angle of the slider 525A as it flies (e.g., as shown in FIG. 2). Nevertheless, for purposes of the description herein, the surface 142 is said to be closest to the recording medium 520 when the slider 525A is situated in a data storage device 500.)

The surface 142 is substantially perpendicular to the leading-edge surface 121, meaning that the leading-edge surface 121 and the surface 142 are oriented effectively perpendicularly to each other for all practical purposes, even if the angle between them is not precisely 90 degrees.

The ABS 150 also includes a surface 144. The surface 144 is adjacent to and intersects the leading-edge surface 121 and, like the surface 142, is also substantially perpendicular to the leading-edge surface 121. The surface 144 is recessed from the surface 142. The recess distance may be, for example, between about 50 nm and about 300 nm. For example, the distance by which the surface 144 is recessed from the surface 142 may be approximately 150 nm. In other words, the height difference between the surface 142 and the surface 144 may be about 150 nm. When the slider 525A is situated in a data storage device 500, the surface 144 is further from the recording medium 520 than the surface 142 is. As indicated by the surface shading in FIG. 3A, the surface 144 is one of a plurality of surfaces that are all recessed from the surface 142 by the recess distance. For example, the surface 230A, the surface 230B, and the surface 230C are all at the same level of the slider ABS 150 as the surface 144. Therefore, all of the surface 144, the surface 230A, the surface 230B, and the surface 230C (among others) are recessed from the surface 142 by the same recess distance. As shown in FIGS. 3A and 3B, each of the surface 230A, the surface 230B, and the surface 230C is also substantially perpendicular to and spaced from the leading-edge surface 121.

As shown in FIGS. 3A and 3B, in the example slider 525A, the surface 144 is separated from the leading pad 220 by a particle-trapping structure 210. In the illustrated example, the particle-trapping structure 210 abuts the base of the leading pad 220 (see, e.g., FIG. 3B). The particle-trapping structure 210 shown in FIGS. 3A and 3B is a continuous cavity that extends below the surface 144 and is configured to collect particles that might otherwise build up on the surfaces of the slider 525A and damage the recording medium 520 or adversely affect the performance of a data storage device 500. The particle-trapping structure 210 can significantly improve particle robustness by capturing particles as the slider 525A flies over the recording medium 520. The particle-trapping structure 210 may have a depth of at least 50 nm below the surface 144. It is to be appreciated that FIGS. 3A and 3B illustrate one example of a particle-trapping structure 210, and that other approaches are possible, as described, for example, in U.S. Pat. Nos. 10,354,685; 10,249,334, both of which are hereby incorporated by reference in their entireties for all purposes.

As illustrated in FIGS. 3A and 3B (as well as in FIGS. 4A and 4B, discussed below), the surface 144 has at least one roughening feature, such as a pattern (e.g., regular or irregular), that renders the surface 144 rougher than the surface 142 and rougher than each of the surface 230A, the surface 230B, and the surface 230B. As described further below, the at least one roughening feature (e.g., a pattern) may be created during the slider 525 fabrication process using, for example, ion milling so as to deliberately roughen at least a portion of the surface 144. The roughening of the surface 144 is an intentional and controlled result of a step (e.g., etching, lapping, ion milling, etc.) in the process to manufacture the slider 525A, and not a byproduct of an imperfect manufacturing step. In other words, the surface 144 is deliberately made less smooth than the surface 142 and at least one other surface at the same level as the surface 144 (e.g., the surface 230A, the surface 230B, the surface 230C, or any other surface at that same level) by adding, in a controlled manner, the at least one roughening feature (e.g., a pattern) to the surface 144. The objective of the at least one roughening feature is to increase the friction coefficient of the surface 144 relative to other surfaces of the slider 525A, such as the surface 142 and other surfaces of the slider 525A (e.g., the surface 230A, the surface 230B, the surface 230C, and/or any other surface that is at the same level as the surface 144). As a result of the roughening of the surface 144, the surface 142 and at least one surface at the same recess distance (level) as the surface 144 (e.g., the surface 230A, the surface 230B, the surface 230C, etc.) is considered to be smooth, non-patterned, or non-roughened, whereas the surface 144 is considered to be rough, patterned, or roughened. "Roughening" the surface 144 by including the at least one roughening feature as described herein promotes rotation and movement of particles that contact the slider 525A, thereby increasing the likelihood that the particles reach the particle-trapping structure 210 and are captured so they are significantly less likely to build up on the ABS 150 and potentially damage the recording medium 520 or cause data recorded on the recording medium 520 to be erased.

In some embodiments, such as the example of FIGS. 3A and 3B, the at least one roughening feature includes a pattern of holes 170 in the surface 144. For example, the surface 144 may include at least 6 holes per 1000 µm². As a result, the surface 144 may have a dimpled appearance (e.g., similar to a surface of a golf ball, but on scale suitable for a slider 525). In other words, the holes 170 may be considered to be a plurality of dimples. (It will be understood that a dimpled appearance can be created in other ways.) In FIG. 3A, only three of the holes 170 are labeled: the hole 170A, the hole 170B, and the hole 170C. The pattern of holes 170 may be a regular pattern (e.g., with holes 170 spaced at uniform distances from each other) or an irregular pattern (e.g., with holes 170 more randomly situated across the surface 144). A density of the holes 170 may be, for example, at least 6 holes per 1000 µm².

FIG. 3C is an example cross-section view of a portion of the slider 525A at the location indicated in FIGS. 3A and 3B. As shown in FIG. 3C, each of the holes 170 has a respective depth (one of which is labeled "d"), that is sufficient to render the surface 144 rougher than the surface 142 (e.g., so that the friction coefficient of the surface 144 is higher than the friction coefficient of the surface 142 as a result of a deliberate step of the manufacturing process). For example, each of the holes 170 can have a depth relative to the surface 144 of at least 2 nm. Depending on the step(s) of the manufacturing process during which the holes 170 are created, the holes 170 can have larger depths (e.g., up to 2 µm, up to 5 µm, etc.). Different holes 170 can have the same depth, or different holes 170 can have different depths, as shown in FIG. 3C. In some embodiments, the maximum depth of the holes 170 is less than the depth of the cavity of the particle-trapping structure 210. In some embodiments, the maximum depth of the holes 170 relative to the surface 144 is greater than the depth of the cavity of the particle-trapping structure 210 relative to the surface 144. In some embodiments, the maximum depth of the holes 170 is between 2 nm and 5 µm relative to the surface 144, and the depth of the cavity of the particle-trapping structure 210 is greater than 200 nm relative to the surface 142. There is no requirement that the depth of the cavity of the particle-trapping structure 210 be above or below the maximum depth of the holes 170.

The holes 170 can have any suitable size and shape in two dimensions (e.g., in the ABS view of FIG. 3A or the cross-section view of FIG. 3C) or three dimensions. For example, in the ABS view, the holes 170 may have recognizable shapes (e.g., circular, square, triangular, etc.), or they may have irregular, random shapes. As explained above, the holes 170 may give the surface 144 a dimpled appearance. Similarly, in a cross-section view, such as FIG. 3C, the holes 170 can have recognizable shapes (e.g., rectangular, triangular, etc.), or they may have irregular, random shapes. Different holes 170 can have the substantially identical shapes, or different holes 170 can have different shapes in two and/or three dimensions. Regardless of whether their shapes are the same, different holes 170 can have the same diameter, circumference, or perimeter, as illustrated in FIGS. 3A, 3B, and 3C, or they can have different diameters, circumferences, and/or perimeters. As will be appreciated by those having ordinary skill in the art in light of the disclosures herein, the sizes, shapes, and density of the holes 170 can be selected to achieve a desired roughness (or friction coefficient) while maintaining suitable flight characteristics for the slider 525A (e.g., stability, lift, etc.). The example holes 170 shown in FIGS. 3A, 3B, and 3C are merely examples and are not intended to be limiting.

Figure 4A:
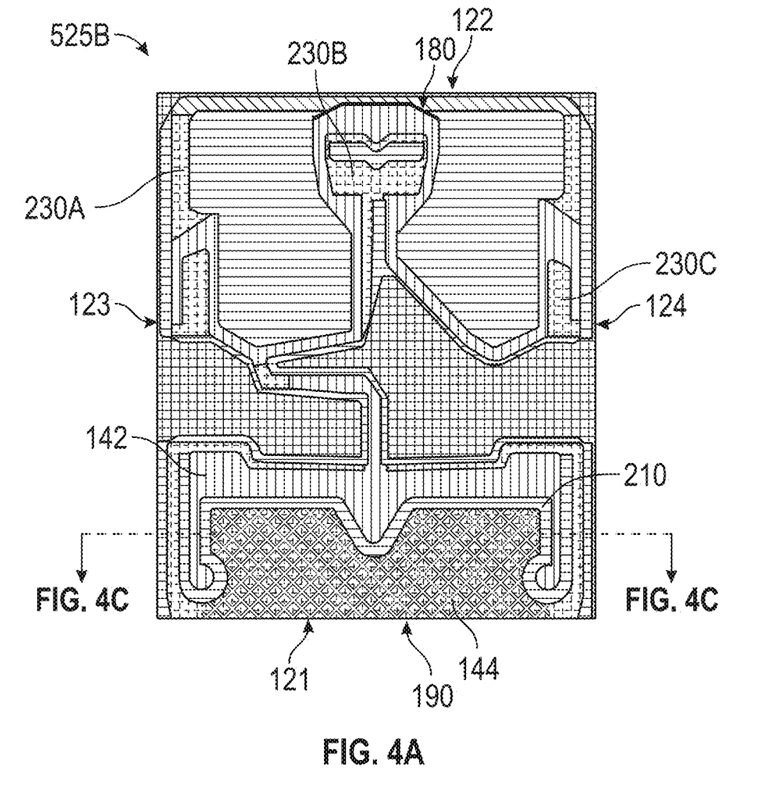
FIG. 4A is an ABS view of another example slider in accordance with some embodiments.
Figure 4B:
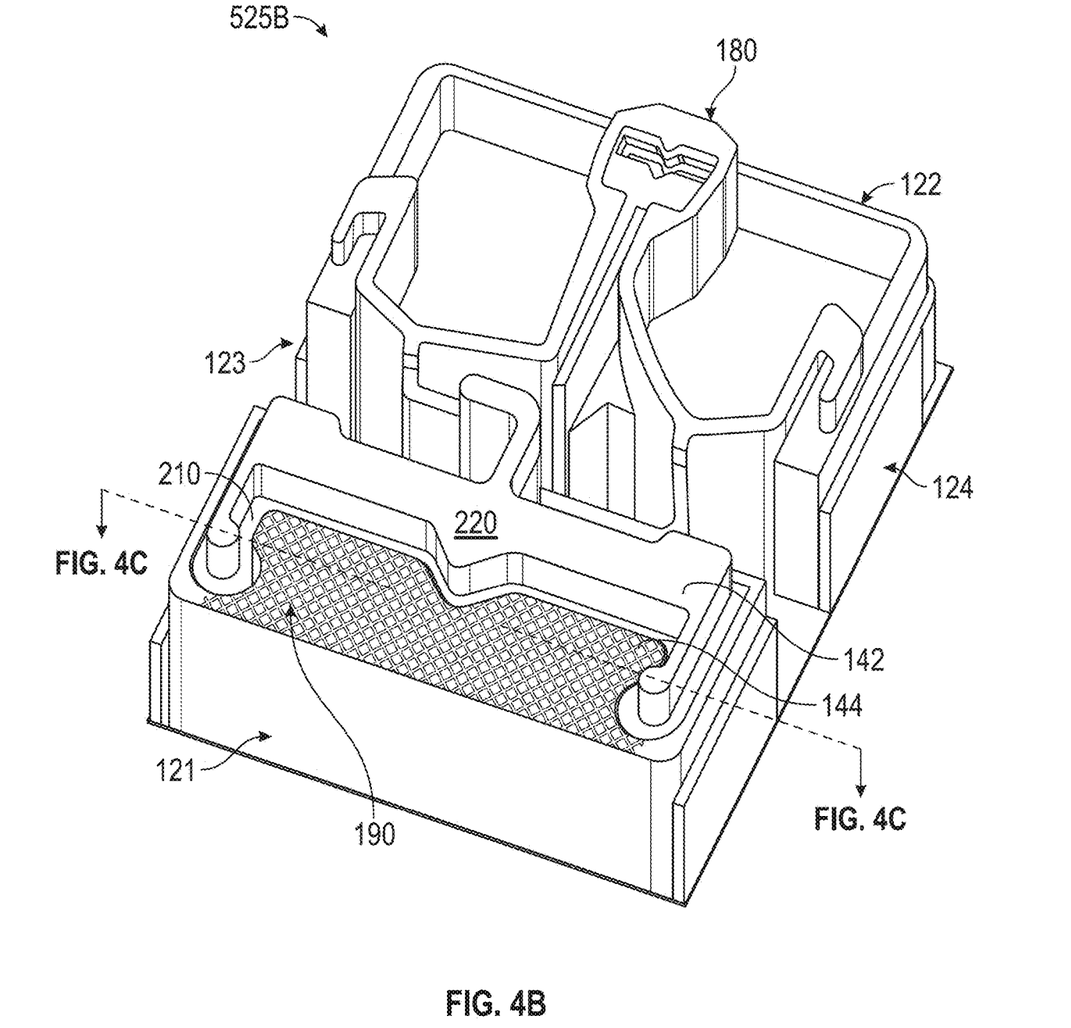
FIG. 4B is an isometric view of the example slider shown in FIG. 4A.
Figure 4C:
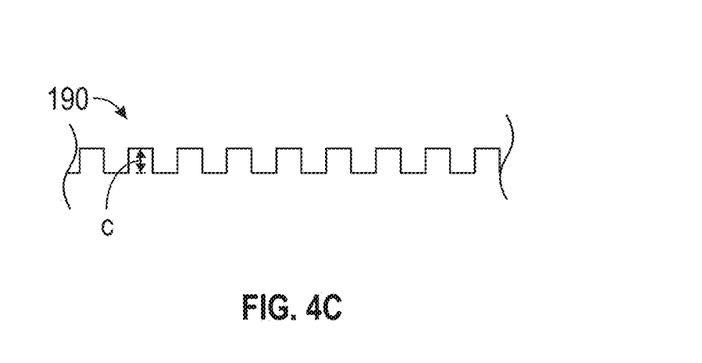
FIG. 4C is a cross-section view of a portion of the slider shown in FIGS. 4A and 4B.

FIG. 4A is an ABS view of another example of a slider 525B in accordance with some embodiments. FIG. 4B is an isometric view of the slider 525B shown in FIG. 4A. FIG. 4C is a cross-section view of a portion of the slider 525B at the location indicated in FIGS. 4A and 4B. The slider 525B includes many of the same features illustrated and described above in the discussion of FIGS. 3A, 3B, and 3C. Those descriptions apply to the elements of FIGS. 4A, 4B, and 4C that have the same reference numerals and are not repeated here.

In the example slider 525B shown in FIGS. 4A, 4B, and 4C, the at least one roughening feature causing the surface 144 to be roughened relative to the surface 142 comprises a cross-hatch pattern 190. The cross-hatch pattern 190 may be a regular pattern (e.g., with uniform spacing between lines or grooves of the cross-hatch pattern 190, as shown in FIGS. 4A, 4B, and 4C) or an irregular pattern (e.g., with irregularly-spaced lines (grooves) and/or lines (grooves) that are not necessarily parallel or at particular angles to each other).

FIG. 4C is a cross-section view of a portion of the slider 525B at the location indicated in FIGS. 4A and 4B. As shown in FIG. 4C, each of the lines or grooves making up the cross-hatch pattern 190 has a depth, c, that is sufficient to render the surface 144 rougher than the surface 142 (e.g., so that the friction coefficient of the surface 144 is higher than the friction coefficient of the surface 142 as a result of a deliberate step of the manufacturing process). For example, each of the lines/grooves in the cross-hatch pattern 190 can have a depth of at least 2 nm. Different parts (e.g., grooves) of the cross-hatch pattern 190 can have the same depth, as shown in FIG. 4C, or different parts of the cross-hatch pattern 190 can have different depths. In some embodiments, the maximum depth of the cross-hatch pattern 190 is less than the depth of the cavity of the particle-trapping structure 210. Likewise, different lines within the cross-hatch pattern 190 can have the same width, as illustrated in FIGS. 4A, 4B, and 4C, or they can have different widths.

The characteristics of the cross-hatch pattern 190 can be selected to achieve a desired roughness (or friction coefficient) while maintaining suitable flight characteristics for the slider 525B (e.g., stability, lift, etc.), as described above in the discussion of FIGS. 3A, 3B, and 3C. The cross-hatch pattern 190 illustrated in FIGS. 4A, 4B, and 4C is just one example of a cross-hatch pattern 190, and is not intended to be limiting.

It is to be appreciated that the cross-sections shown in FIGS. 3C and 4C are examples that are applicable to other slider 525 embodiments. For example, the cross-section shown in FIG. 3C is also applicable to the slider 525B illustrated in FIGS. 4A and 4B (e.g., if all of the holes 170 along the axis indicated have the same depth), and, likewise, the cross-section shown in FIG. 4C is applicable to the slider 525A shown in FIGS. 3A and 3B (e.g., if different portions of the cross-hatch pattern 190 have different depths). As explained above, different portions of the roughening feature (s) that result in the surface 144 being rough can have different depths or the same depth.

The texturizing or roughening of the surface 144 can be accomplished during fabrication of the slider 525 (e.g., slider 525A or slider 525B). In some embodiments, an additional step is added to the manufacturing procedure to roughen the surface 144. In some embodiments, the surface 144 is roughened during a manufacturing step in which other features of the slider 525 are being created. The following discussion refers generally to a slider 525. It is to be understood that the slider 525 referred to below can be any slider 525 that includes a roughened surface 144 as described above (e.g., the slider 525A, the slider 525B, etc.).

The slider 525 can be fabricated from a wafer using a photolithography process having two fundamental steps: (a) covering a portion of a surface of the wafer (e.g., using a photoresist mask), and (b) removing substrate material from the exposed (e.g., not covered by the mask) surface of the wafer. Step (a) may be accomplished, for example, using a binary mask having hard edges to create a well-defined pattern in a photoresist layer that is applied to the wafer surface. Step (b) may be accomplished, for example, by lapping, etching, or milling (e.g., using an ion beam) to transfer the photoresist pattern to the wafer surface. The surface of the slider 525 to which the covering is applied and from which material is removed is the surface that will eventually face the recording medium 520 when the slider 525 is used in a data storage device 500, i.e., the ABS 150.

The steps (a) and (b) may be repeated multiple times to create different features of the slider 525. The following discussion focuses on the ABS 150 features near the leading-edge surface 121, but it will be appreciated that the other features of the ABS 150 can also be fabricated during the described steps or during other steps of the slider 525 manufacturing process that are known in the art.

In some embodiments, a first application of the step (a) covers (e.g., using a mask) the surface 142 and other features of the ABS 150 that remain at the same level as the surface 142 in the finished slider 525. While the mask is in place, the first application of step (b) may use shallow ion milling to remove material to create a smooth version of the surface 144. That mask can then be removed. A different mask can then be applied, and the steps (a) and (b) repeated to create features that are recessed further from the top-most surface of the ABS 150 (e.g., recessed from the surface 142). In one of the subsequent applications of step (b), deep(er) ion milling can be used to roughen the surface 144 (e.g., by creating holes 170, a cross-hatch pattern 190, a plurality of dimples, a plurality of grooves, etc.) as described above. It will be appreciated that a pattern having a variety of depths can be created using multiple masks and multiple material-removal steps (e.g., using ion milling).

Figure 5:
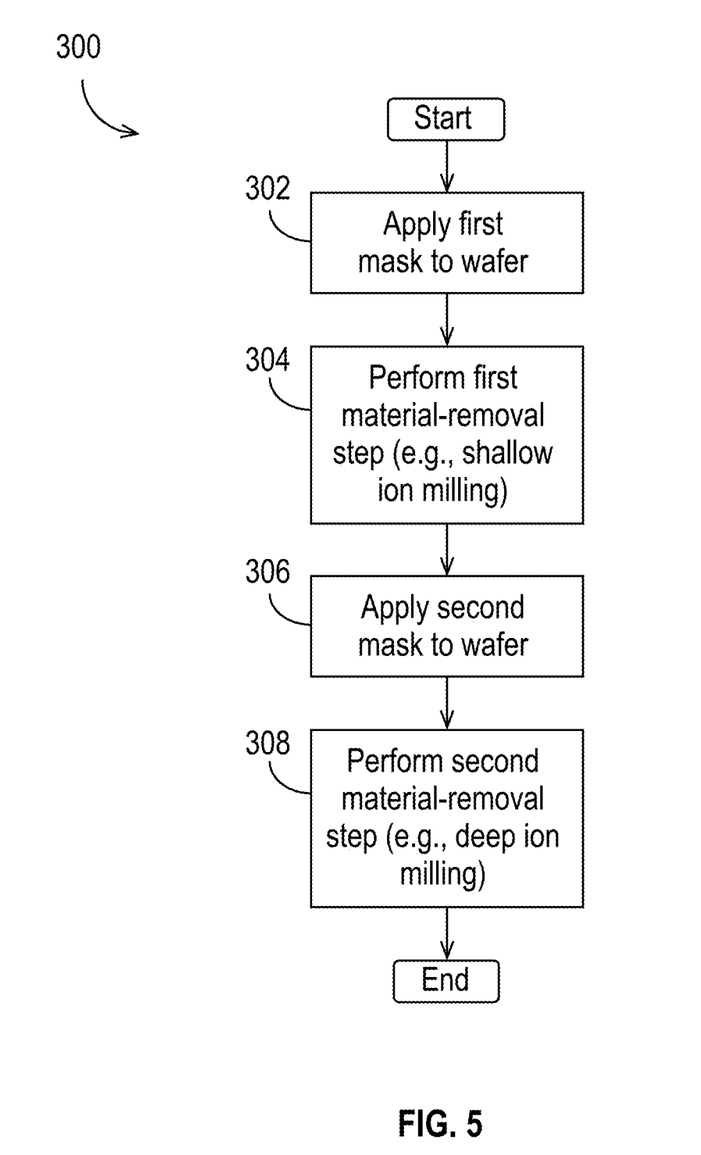
FIG. 5 is a flow diagram illustrating a portion of an example method that can be used to fabricate embodiments of the sliders having a roughened surface in accordance with some embodiments.

FIG. 5 is a flow diagram illustrating a portion of an example method 300 that can be used to fabricate embodiments of sliders 525 having a roughened surface 144 in accordance with some embodiments. As explained above, the slider 525 fabrication process can include additional steps that are known in the art but that are not shown in FIG. 5. These additional steps may be performed before, between, and/or after the steps illustrated in FIG. 5. As explained above, although the description of the method 300 focuses only the steps of the method 300 related to creating and roughening the surface 144, it will be appreciated that other features of the slider 525 can also be created during these steps.

At block 302, a first mask is applied to the wafer. The first mask includes a region that protects where the leading pad 220 will be situated in the finished slider 525. At block 304, a first material-removal step is performed to remove material from the wafer. The first material-removal step may use, for example, shallow ion milling. At least a portion of the leading pad 220 may be apparent in the slider 525 after block 304 is complete. The surface 144 may also be present, in its pre-roughened form, after block 304 is complete.

After completion of block 304, and potentially additional intervening manufacturing steps, at block 306, a second mask is applied to the wafer. The second mask covers the surface 142, and it also covers the surface 144 except in the locations/regions where the at least one roughening feature (e.g., a pattern of holes 170, cross-hatch pattern 190, plurality of dimples, plurality of grooves, etc.) will be created and situated. At block 308, a second material-removal step is performed to remove additional material from the wafer, including the material from the surface 144 that creates at least part of the at least one roughening feature in the surface 144 and causes it to be a roughened surface. The second material-removal step may use, for example, deep(er) ion milling. Following block 308, at least part of the at least one roughening feature (e.g., a regular or irregular pattern, holes 170, cross-hatch pattern 190, plurality of dimples, plurality of grooves, etc.) is present in the slider 525.

It will be appreciated that a variety of features that cause the surface 144 to be rougher than the surface 142 can be created. For example, in a slider 525 in which the at least one roughening feature comprises holes 170 on the surface 144 (e.g., as described in the discussion of FIGS. 3A, 3B, and 3C), the steps (a) and (b) (e.g., block 306 and block 308) can be performed once to create a pattern of holes 170 of the same depth, or steps (a) and (b) (e.g., block 306 and block 308) can be repeated with different masks to create holes 170 having different depths relative to the surface 144. The examples provided herein are not intended to be limiting. Similarly, in a slider 525 in which the at least one roughening feature comprises a cross-hatch pattern 190 (or another pattern) on the surface 144 (e.g., as described in the discussion of FIGS. 4A, 4B, and 4C), the steps (a) and (b) (e.g., block 306 and block 308) can be performed once to create a pattern having a uniform depth, or steps (a) and (b) (e.g., block 306 and block 308) can be repeated with different masks to create a pattern that has variable and different depths relative to the surface 144. It will be understood by those having ordinary skill in the art in light of the disclosures herein that there are many possible patterns and features that can be created during the manufacturing process that will result in the surface 144 being deliberately rougher than the surface 142 (and other surfaces of the slider 525). The examples herein are not intended to be limiting. Furthermore, the roughening feature(s) can be created using any suitable process or manufacturing step. Although it may be convenient to create the roughening feature(s) (e.g., holes 170, cross-hatch pattern 190, plurality of dimples, plurality of grooves, etc.) via a controlled etching process, it is envisioned that the surface 144 can be made rougher than other surfaces using other approaches, such as, for example, lapping (e.g., using a rough or coarse slurry). As will be appreciated by those having ordinary skill in the art, in some types of lapping processes, abrasive particles in a slurry pass over and scratch the surface of a wafer while pressure is applied to the wafer.

It is also to be appreciated that other surfaces of the slider 525 where particles may tend to build up can also be roughened using the techniques disclosed herein in order to promote particle mobility (e.g., rotation) in those areas. As will be recognized by those having ordinary skill in the art, surfaces near particle-trapping structures such as those described in U.S. Pat. Nos. 10,354,685; 10,249,334 (incorporated by reference) could be roughened using the techniques and disclosures herein to promote particle mobility and potentially increase the likelihood of particles being captured by particle-trapping structures rather than building up on the ABS 150 of the slider 525.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As another example, two surfaces are "substantially perpendicular" when they are considered to be perpendicular to each other for all practical purposes, even if they are not precisely at 90 degrees relative to each other.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A slider, comprising:
   a leading-edge surface; and
   a media-facing surface comprising a plurality of surfaces, including:
      a first surface, wherein the first surface is substantially perpendicular to the leading-edge surface and, of the plurality of surfaces of the media-facing surface, is configured to be situated closest to a recording medium,
      a second surface directly adjacent to the leading-edge surface and substantially perpendicular to the leading-edge surface, wherein the second surface is recessed from the first surface by a first distance, and
      a third surface spaced from the leading-edge surface and substantially perpendicular to the leading-edge surface, wherein the third surface is recessed from the first surface by the first distance,
   wherein the second surface comprises at least one roughening feature that results in at least a portion of the second surface having a higher friction coefficient than both the first surface and the third surface.

2. The slider recited in claim 1, wherein the at least one roughening feature includes at least 6 holes per 1000 $\mu m^2$ in the second surface.

3. The slider recited in claim 2, wherein each of the at least 6 holes per 1000 $\mu m^2$ has a depth of at least 2 nm.

4. The slider recited in claim 1, wherein the first distance is between approximately 50 nm and approximately 300 nm.

5. The slider recited in claim 1, wherein the at least one roughening feature comprises a predefined pattern.

6. The slider recited in claim 5, wherein the predefined pattern comprises a plurality of dimples.

7. The slider recited in claim 5, wherein the predefined pattern comprises at least 6 holes per 1000 $\mu m^2$.

8. The slider recited in claim 7, wherein at least two of the at least 6 holes per 1000 $\mu m^2$ have a substantially identical shape.

9. The slider recited in claim 5, wherein a depth of at least a portion of the predefined pattern is at least 2 nm relative to the second surface.

10. The slider recited in claim 5, wherein the predefined pattern comprises a cross-hatch.

11. The slider recited in claim 5, wherein the predefined pattern comprises a plurality of grooves.

12. The slider recited in claim 5, wherein the predefined pattern is irregular.

13. The slider recited in claim 5, wherein a first portion of the predefined pattern has a first depth, and a second portion of the predefined pattern has a second depth, wherein the first depth differs from the second depth.

14. A data storage device, comprising:
a recording medium; and
a slider comprising:
  a leading-edge surface, and
  a media-facing surface comprising a plurality of surfaces, including:
    a first surface, wherein the first surface is substantially perpendicular to the leading-edge surface and, of the plurality of surfaces of the media-facing surface, is configured to be situated closest to the recording medium,
    a second surface directly adjacent to the leading-edge surface and substantially perpendicular to the leading-edge surface, wherein the second surface is recessed from the first surface by a first distance, and
    a third surface recessed from the leading-edge surface and substantially perpendicular to the leading-edge surface, wherein the third surface is recessed from the first surface by the first distance,
  wherein the second surface comprises at least one roughening feature that results in at least a portion of the second surface having a higher friction coefficient than both the first surface and the third surface.

15. The data storage device recited in claim 14, further comprising:
helium between the recording medium and the slider,
wherein the data storage device is sealed to prevent the helium from escaping from an interior of the data storage device.

16. A slider comprising:
a leading-edge surface,
a first non-patterned surface substantially perpendicular to and spaced from the leading-edge surface,
a second non-patterned surface substantially perpendicular to and spaced from the leading-edge surface, and
a patterned surface directly adjacent to and substantially perpendicular to the leading-edge surface, wherein the patterned surface comprises a predefined pattern that results in the patterned surface having a higher friction coefficient than both the first non-patterned surface and the second non-patterned surface, and wherein the patterned surface and at least one of the first non-patterned surface or the second non-patterned surface are at a same level of an air-bearing surface of the slider.

17. The slider recited in claim 16, wherein the predefined pattern comprises at least 6 holes per 1000 $\mu m^2$.

18. The slider recited in claim 17, wherein at least two of the at least 6 holes per 1000 $\mu m^2$ have a substantially identical shape.

19. The slider recited in claim 17, wherein a depth of at least one of the at least 6 holes per 1000 $\mu m^2$ is at least 2 nm.

20. The slider recited in claim 16, wherein the predefined pattern comprises a plurality of grooves.

21. The slider recited in claim 16, wherein the predefined pattern is a cross-hatch pattern.

22. The slider recited in claim 16, further comprising:
a particle-trapping structure adjacent to the patterned surface, wherein, in an orientation in which the first non-patterned surface, the second non-patterned surface, and the patterned surface are oriented upward, the particle-trapping structure comprises at least one cavity extending below the patterned surface.

23. The slider recited in claim 22, wherein a maximum depth of the predefined pattern is between approximately 2 nm and approximately 2 $\mu m$, and wherein a depth of the at least one cavity is at least 200 nm relative to the first non-patterned surface or the second non-patterned surface.

24. The slider recited in claim 16, wherein the slider comprises a plurality of surfaces, including a first surface and a second surface, wherein, in an orientation in which an air-bearing surface of the slider is oriented upward, the second surface is below the first surface, and wherein the first non-patterned surface is included in the first surface, and both the patterned surface and the second non-patterned surface are included in the second surface.

25. The slider recited in claim 24, wherein a height difference between the first surface and the second surface is between approximately 50 nm and approximately 300 nm.

26. A method of making a slider comprising a leading-edge surface, a first non-patterned surface substantially perpendicular to and spaced from the leading-edge surface, a second non-patterned surface substantially perpendicular to and spaced from the leading-edge surface, and a patterned surface directly adjacent to and substantially perpendicular to the leading-edge surface, wherein the patterned surface and at least one of the first non-patterned surface or the second non-patterned surface are at a same level of an air-bearing surface of the slider, and wherein the patterned surface comprises a predefined pattern that results in the patterned surface having a higher friction coefficient than both the first non-patterned surface and the second non-patterned surface, the method comprising:
applying a mask to a wafer, wherein the mask defines the predefined pattern; and
while the mask is in place, performing an ion milling step to create the predefined pattern.

27. A data storage device comprising:
a slider, comprising:
  a leading-edge surface,
  a first non-patterned surface substantially perpendicular to and spaced from the leading-edge surface,
  a second non-patterned surface substantially perpendicular to and spaced from the leading-edge surface, and
  a patterned surface directly adjacent to and substantially perpendicular to the leading-edge surface, wherein the patterned surface and at least one of the first non-patterned surface or the second non-patterned surface are at a same level of an air-bearing surface of the slider, and wherein the patterned surface comprises a predefined pattern that results in the patterned surface having a higher friction coefficient than both the first non-patterned surface and the second non-patterned surface; and
a recording media situated facing the patterned surface, the first non-patterned surface, and the second non-patterned surface.

28. The data storage device recited in claim 27, further comprising:
helium between the recording media and the slider,
wherein the data storage device is sealed to prevent the helium from escaping from an interior of the data storage device.

* * * * *